(12) United States Patent
Biffard et al.

(10) Patent No.: US 12,074,497 B2
(45) Date of Patent: Aug. 27, 2024

(54) LIQUID COOLED MOTOR ENCLOSURE, LIQUID COOLED MOTOR, VEHICLE INCLUDING LIQUID COOLED MOTOR, AND METHOD FOR COOLING A MOTOR

(71) Applicant: Zero Motorcycles, Inc., Scotts Valley, CA (US)

(72) Inventors: Ryan Biffard, Kelowna (CA); Eddie Smith, Scotts Valley, CA (US); Brian Wismann, Felton, CA (US)

(73) Assignee: ZERO MOTORCYCLES, INC., Scotts Valley, CA (US)

( * ) Notice: Subject to any disclaimer, the term of this patent is extended or adjusted under 35 U.S.C. 154(b) by 314 days.

(21) Appl. No.: 17/553,625

(22) Filed: Dec. 16, 2021

(65) Prior Publication Data
US 2023/0198334 A1 Jun. 22, 2023

(51) Int. Cl.
*H02K 5/20* (2006.01)
*B60K 1/04* (2019.01)
(Continued)

(52) U.S. Cl.
CPC .............. *H02K 5/203* (2021.01); *B60K 1/04* (2013.01); *H02K 9/19* (2013.01); *H02K 11/0094* (2013.01); *B60K 2001/006* (2013.01)

(58) Field of Classification Search
CPC ............ H02K 5/203; H02K 5/20; H02K 9/19; H02K 11/0094; B60K 1/04
See application file for complete search history.

(56) References Cited

U.S. PATENT DOCUMENTS 5,133,302 A * 7/1992 Yamada ................... F01P 7/048
123/41.12
6,300,693 B1 * 10/2001 Poag ....................... H02K 5/203
310/58

(Continued)

FOREIGN PATENT DOCUMENTS

DE   10 2009 047 215 A1   6/2011
DE   10 2014 102 632 A1   9/2014

(Continued)

OTHER PUBLICATIONS

International Search Report and Written Opinion issued in corresponding International Application No. PCT/US22/51073, dated Feb. 21, 2023, pp. 1-11.

*Primary Examiner* — John D Walters
(74) *Attorney, Agent, or Firm* — Carter, DeLuca & Farrell LLP

(57) ABSTRACT

A liquid cooled motor enclosure includes a fluid tight space adapted to contain a coolant fluid. A motor is arranged inside the enclosure and is thermally coupled to the inner side of the enclosure. An inlet manifold is located at one axial end of the enclosure, and an outlet manifold is located at the opposite axial end of the enclosure. The cross-sectional areas of the inlet and outlet manifolds are sized and configured to provide for substantially uniform flow of coolant around the entire circumference of the enclosure and/or so that coolant flowing in the space from the inlet manifold toward the outlet manifold is substantially axial. A plurality of projections extend into the space to increase the surface area in contact with the coolant fluid and increase turbulence in the coolant fluid flowing in the space to increase heat transfer from the motor to the inner shell and from the inner shell to the coolant fluid.

24 Claims, 6 Drawing Sheets

(51) Int. Cl.
*H02K 9/19* (2006.01)
*H02K 11/00* (2016.01)
*B60K 1/00* (2006.01)

(56) References Cited

U.S. PATENT DOCUMENTS

| | | | |
|---|---|---|---|
| 7,948,126 | B2 | 5/2011 | Fulton et al. |
| 8,212,438 | B2 * | 7/2012 | Belton .................... H02K 9/19 |
| | | | 310/52 |
| 10,230,287 | B2 | 3/2019 | Sever |
| 2011/0175467 | A1 | 7/2011 | Belton |
| 2013/0270938 | A1 | 10/2013 | Matsuda |
| 2020/0130498 | A1 | 4/2020 | Matsushima et al. |
| 2021/0115925 | A1 | 4/2021 | Izuka et al. |
| 2021/0242748 | A1 | 8/2021 | Wong et al. |

FOREIGN PATENT DOCUMENTS

| | | |
|---|---|---|
| DE | 10 2013 222 697 A1 | 5/2015 |
| WO | 2018153001 A1 | 8/2018 |

* cited by examiner

LIQUID COOLED MOTOR ENCLOSURE, LIQUID COOLED MOTOR, VEHICLE INCLUDING LIQUID COOLED MOTOR, AND METHOD FOR COOLING A MOTOR

FIELD OF THE INVENTION

The present invention relates to a liquid cooled motor enclosure, a liquid cooled motor, a vehicle including a liquid cooled motor, and a method for cooling a motor.

BACKGROUND INFORMATION

Electric motors generate heat during their operation, and excess heat in, or the inability to remove heat energy from, an electric motor may negatively affect performance, service life, efficiency, etc. The amount of work that an electric motor may perform may be proportional to the amount of heat that can be removed. Electric motors often include heat-sensitive components that may be damaged or destroyed if excess heat is not extracted from the motor.

A variety of techniques may be used to extract heat energy from an electric motor. For example, an electric motor may be air cooled or liquid cooled.

SUMMARY

Example embodiments of the present invention provide a liquid cooled motor enclosure, a liquid cooled motor, a vehicle including a liquid cooled motor, and a method for cooling a motor.

According to an example embodiment of the present invention, a liquid cooled motor enclosure includes: an outer shell; an inner shell connected to the outer shell, a fluid tight space being formed between the inner shell and the outer shell, the inner shell having a recess adapted to receive a motor therein, the inner shell being adapted to thermally couple to the motor; an inlet manifold arranged proximate to a first axial end of the inner shell and/or the outer shell; and an outlet manifold arranged proximate to a second axial end of the inner shell and/or the outer shell opposite the first axial end. The inner shell includes a plurality of projections extending into the space formed between the inner shell and the outer shell, and the manifolds have a larger cross-section in a radial direction, over at least a portion of an entire circumference of the motor enclosure, than the fluid tight space. The projections increase the surface area of the inner shell that is in contact with the coolant fluid to thereby increase heat transfer from the motor to the inner shell and from the inner shell to the coolant fluid, and the manifolds are sized and configured to provide for substantially uniform flow of coolant around the entire circumference of the enclosure.

The space formed between the inner shell and the outer shell may be adapted to contain a coolant fluid.

The coolant fluid may include a water-based coolant fluid or an oil-based coolant fluid.

The inner shell and/or the outer shell may be substantially cylindrical.

The projections may extend axially from the inner shell toward the outer shell.

The projections may extend between the inner shell and the outer shell.

The projections may thermally couple the inner shell and the outer shell.

The inner shell has a higher thermal conductivity than the outer shell.

The projections may be substantially cylindrical.

The motor may be arranged as a motor of an electric vehicle, e.g., a two-wheeled vehicle.

The liquid cooled motor enclosure may include a seal arranged between the inner shell and the outer shell adapted to fluidically seal the fluid tight space located between the inner shell and the outer shell.

The recess may be substantially cylindrical.

The projections may be adapted to increase turbulence in coolant fluid flowing in the space.

The inner shell may be adapted to be mounted directed around the motor.

According to an example embodiment of the present invention, a motor includes: a stator; a rotor arranged inside of the stator and rotatable relative to the stator; and a liquid cooled motor enclosure. The stator and rotor are arranged inside of the liquid cooled motor enclosure, the liquid cooled motor enclosure is thermally coupled to the stator, and the liquid cooled motor enclosure includes: an outer shell; an inner shell connected to the outer shell, a fluid tight space being formed between the inner shell and the outer shell, the inner shell having a recess, the motor being received in the recess, the inner shell being thermally coupled to the motor; an inlet manifold arranged proximate to a first axial end of the inner shell and/or the outer shell; and an outlet manifold arranged proximate to a second axial end of the inner shell and/or the outer shell opposite the first axial end. The inner shell includes a plurality of projections extending into the space formed between the inner shell and the outer shell, and the manifolds have a larger cross-section in a radial direction, over at least a portion of an entire circumference of the motor enclosure, than the fluid tight space.

The motor may include a radiator connected between the coolant fluid inlet, a coolant fluid contained in the radiator and the fluid tight space formed between the inner shell and the outer shell, and a pump adapted to pump the coolant fluid to circulate the coolant fluid between the radiator and the fluid tight space formed between the inner shell and the outer shell.

The motor may include a fan adapted to force and airflow through, past, and/or along the radiator to dissipate to the external environment heat energy transferred from the motor to the coolant fluid and from the coolant fluid to the radiator.

According to an example embodiment of the present invention, a vehicle includes: an energy storage device adapted to store electrical energy; at least one wheel; and a motor adapted to be powered by the electrical energy stored in the energy storage device and to drive the wheel to propel the vehicle. The motor including: a stator; a rotor arranged inside of the stator and rotatable relative to the stator; and a liquid cooled motor enclosure. The stator and rotor are arranged inside of the liquid cooled motor enclosure, the liquid cooled motor enclosure is thermally coupled to the stator, and the liquid cooled motor enclosure includes: an outer shell; an inner shell connected to the outer shell, a fluid tight space being formed between the inner shell and the outer shell, the inner shell having a recess, the motor being received in the recess, the inner shell being thermally coupled to the motor; an inlet manifold arranged proximate to a first axial end of the inner shell and/or the outer shell; and an outlet manifold arranged proximate to a second axial end of the inner shell and/or the outer shell opposite the first axial end. The inner shell includes a plurality of projections extending into the space formed between the inner shell and the outer shell, and the manifolds have a larger cross-section in a radial direction, over at least a portion of an entire circumference of the motor enclosure, than the fluid tight space.

The vehicle may be arranged as a two-wheeled electric vehicle, and the energy storage device may include a rechargeable battery.

Further features and aspects of example embodiments of the present invention are described in more detail below with reference to the appended schematic Figures.

DETAILED DESCRIPTION

Figure 1:
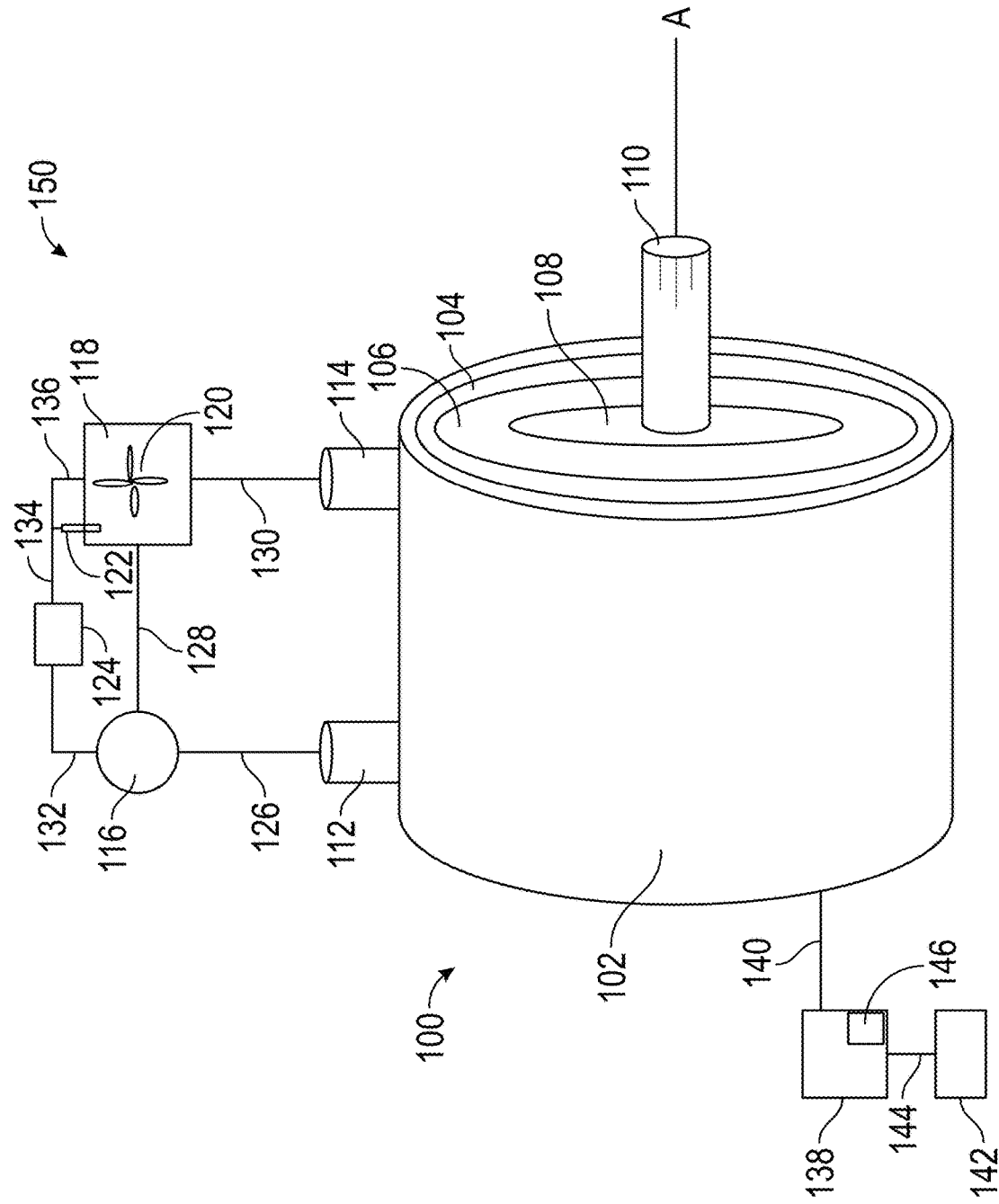
FIG. 1 schematically illustrates a motor according to an example embodiment of the present invention.
Figure 2:
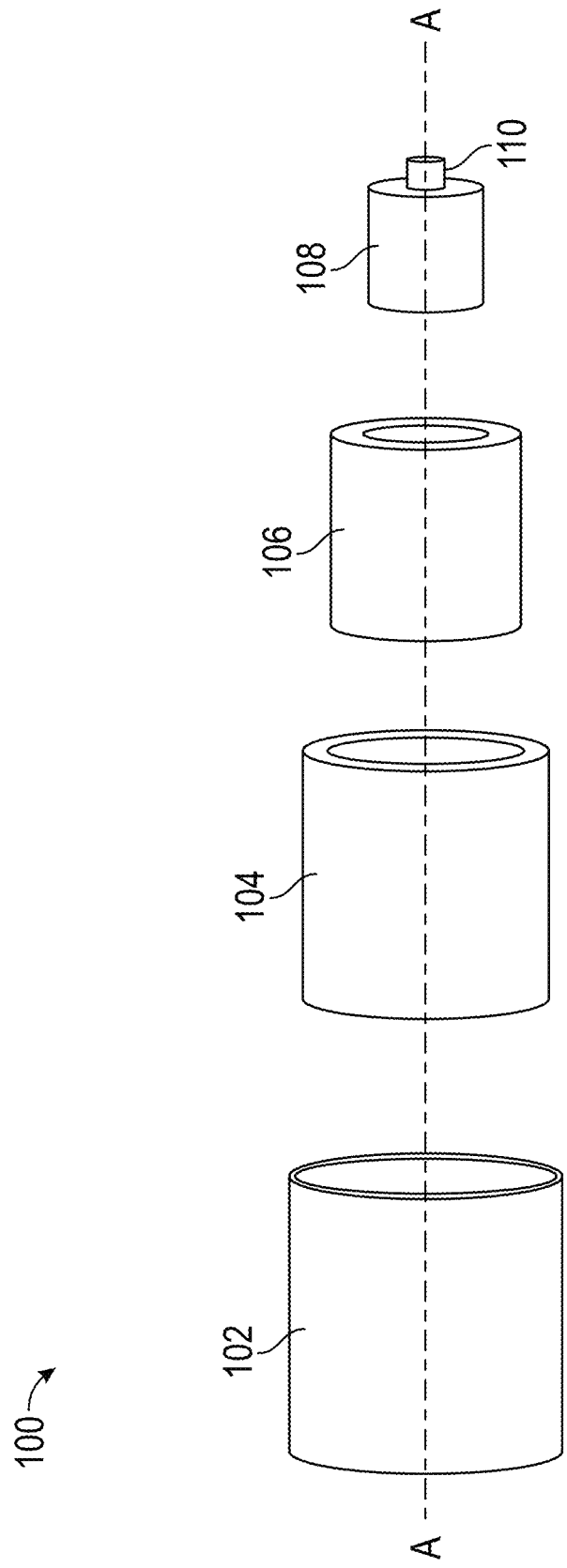
FIG. 2 is a schematic exploded view of the motor illustrated in FIG. 1.

FIG. 1 is a schematic perspective view of a motor 100 according to an example embodiment of the present invention, and FIG. 2 is a schematic exploded view of the motor 100. The motor 100 includes a shell or housing 102, which may be generally cylindrical as illustrated in FIG. 1. Arranged, for example, radially and concentrically, inside of housing 102 is a cooling sleeve or jacket 104, and arranged, for example, radially and concentrically, inside of jacket 104 is a core or stator 106 of the motor 100. The jacket 104 and stator 106 are rotationally fixed relative to the housing 102. A rotor 108 is arranged, for example, radially and concentrically inside stator 106 and is rotatable about axis of rotation A with respect to stator 6, jacket 104, and housing 102. Rotor 108 is connected to and/or includes a shaft 110, which is rotatable with the rotor 108 to drive, for example, a pinion, a gear, a transmission, etc., connected to the shaft 110. The distal end of shaft 110 may be keyed, splined, knurled, etc., so that the pinion, gear, transmission, etc., connected to the shaft 110 engages with the shaft 110 in a rotationally fixed manner. Therefore, rotation of the shaft 110 results in corresponding rotation of the pinion, gear, transmission, etc. connected to the shaft 110.

The motor 100 may be arranged, for example, as a DC motor, an AC motor, e.g., a brushless, permanent magnet, three phase AC motor, etc., supplied via line(s) 140. Line(s) 140 may supply power, e.g., DC power for a DC motor, AC power for an AC motor, etc., and/or data communication signals from a controller 138 to the motor 100 and/or between the controller 138 and the motor 100. The controller 138 may include an inverter 146 to convert DC power supplied by an energy source or energy storage device 142, e.g., a battery, which may be arranged, for example, as a rechargeable, lithium-ion battery, via line(s) 144. It should be appreciated that controller 138 and inverter 146 may be arranged as an integrated unit or may be arranged as separate units. Additionally, the controller 138 and/or inverter 146 may be integrated with the motor 100 and/or may be separate from the motor 100.

Operation of the motor 100 produces or generates heat energy. This heat energy should be extracted from the motor and dissipated, e.g., to the environment. Therefore, a cooling system 150 is provided to extract heat, produced or generated by operation of the motor 100, from the motor 100 and to dissipate it to the environment. As illustrated in FIG. 1, the motor 100 includes an inlet 112 to receive the flow of a coolant fluid 148 and an outlet 114 to expel the flow of coolant fluid 148. The flow of coolant fluid 148 into the motor 100 via the inlet 112 and out from the motor 100 via the outlet 114 extracts heat energy from the motor 100, thereby cooling the motor 100, by transfer of heat energy from the motor 100 to the coolant fluid 148. While inlet 112 and outlet 114 are illustrated in FIG. 1 at opposite axial end areas of the motor 100, it should be understood that the inlet 112 and outlet 114 may be positioned at different locations other than those illustrated in FIG. 1. Moreover, while FIG. 1 illustrates the outlet 114 being locate at the axial end area of the motor 100 on the side of the shaft 110 and the inlet 112 being located at the opposite axial end area of the motor 100, the positions of the inlet 112 and outlet 114 may be reversed. In other words, reference numeral 112 may indicate an outlet instead of an inlet, and reference numeral 114 may indicated an inlet instead of an outlet.

The coolant fluid 148 enters the motor 110 via inlet 112 at a first temperature, absorbs heat energy from the motor 100 as explained in more detail below, and exits the motor 110 at a second temperature higher than the first temperature. The coolant fluid 148 releases the absorbed heat energy to the environment, for example, cooling the coolant fluid 148 from the second temperature back to a reduced temperature, e.g., the first temperature. To achieve this cooling effect, the coolant fluid 148 circulates through the cooling system 150 as described in more detail below.

The coolant fluid 148 may be a liquid coolant, a gaseous coolant, or a combination thereof. For example, in certain implementations, the cooling system 150 may be arranged as a vapor-compression system, and the coolant fluid 148 may be a refrigerant. In other implementations, the coolant fluid 148 is a liquid coolant, such as an oil-based coolant, a water-based coolant, etc.

The cooling system 150 includes a coolant circulator or pump 116 to circulate or pump the coolant fluid 148 through the cooling system 150. The pump 116 is connected to the inlet 112 by line 126 located between an outlet of the pump 116 and the inlet 112. An inlet of the pump 116 is connected to a heat exchanger or radiator 118 by line 128 located between the pump 116 and the radiator 118, and the radiator 118 is connected to the outlet 114 by a line 130 located between the radiator 118 and the outlet 114. The pump 116 may be driven by the motor 100, e.g., via the shaft 110, a power take-off driven by the shaft 110, etc. The pump 116 may be driven by and/or includes a motor separate from motor 100. For example, the pump 116 is driven by a motor supplied by the energy storage device 142.

As noted above, the outlet of the pump 116 is connected to the inlet 112 via line 126 so that coolant fluid 148 is pumped by the pump 116 from the outlet of the pump 116 through line 126, then through inlet 112 into the motor 100, where the coolant fluid 148 absorbs heat energy generated by the motor 100. The heated coolant fluid 1148 exits the outlet 114 at a higher temperature than entering at the inlet 112. From the outlet 114, the coolant fluid 148 is pumped by the pump 116 through line 130 to the inlet of radiator 118, which is arranged as a heat exchanger to dissipate to the environment heat absorbed by the coolant fluid 148. Radiator 118 may include a fan 120, e.g., to actively force ambient or environmental air past, through, and/or across the radiator 118, and/or may be arranged as a passive system, in which motion of the radiator 118 cause ambient or environmental air to pass, pass through, and/or pass across the radiator 118. The movement of ambient or environmental air past, through, and/or across the radiator 118 transfers heat energy from the coolant fluid 148 to the ambient or environmental air to thereby cool the coolant fluid 148 from the temperature entering the radiator 118 to a lower temperature. After being cooled by the radiator 118, the coolant fluid 148 exits the radiator 118 from an outlet of the radiator and flows through line 128 into an inlet of the pump 116, which recirculates the coolant fluid 148 again through the motor 100.

A controller 124 may be connected to the pump 116 by line 132, to fan 120 by line 136, and to a temperature sensor 122 by line 134. Lines 132, 134, 136 may represent direct communication lines between controller 124 and pump 116, between controller 124 and temperature sensor 122, and between controller 124 and fan 120, respectively. However, it should be appreciated that lines 132, 134, 136 represent a bus, e.g., a CAN bus by which controller 124, pump 116, fan 120, and temperature sensor 122 communication with each other and/or with further devices or components, e.g., controller 138. Controller 138 and controller 124 may be arranged as separate components or may be integrated as a common controller, e.g., ECU. The temperature sensor 122 may measure and/or detect the temperature of the coolant fluid 148 in the radiator 118, and the controller 124 may turn on and off the fan 120 in the circumstance that the temperature of the coolant fluid 148 in the radiator 118 reaches and/or exceeds a predetermined threshold temperature. Temperature sensor 122 may be arranged to turn on and off the fan 120 independent of the controller 124. In other words, temperature sensor 122 may be arranged as a thermostat to turn on and off the fan 120 in the circumstance that the temperature of the coolant fluid 148 in the radiator reaches and/or exceeds a predetermined threshold temperature. Accordingly, effective and efficient dissipation of heat energy, e.g., cooling, of the coolant fluid 148 may be achieved, and consequently, effective and efficient dissipation of heat energy, e.g., cooling, of the motor 100 may be achieved.

While a pump 116 is described above for creating a flow of coolant fluid 148 through cooling system 150, it should be appreciated that flow of coolant fluid 148 through cooling system may be obtained convectively, e.g., by a temperature differential of the coolant fluid 148 in the cooling system 150. Thus, for example, motor 100 may be located below radiator 118 such that transfer of heat energy from motor 100 to coolant fluid 148 causes the heated coolant fluid 148 to rise from the motor 100 toward the radiator 118 due to the decrease in density of the coolant fluid 148 based on its temperature rise. Upon cooling in the radiator 118, the coolant fluid 148 increases in density and flows back toward motor 100, where the coolant fluid 148 is again heated to repeat the circulation of coolant fluid 148 in the cooling system 150.

Figure 3:
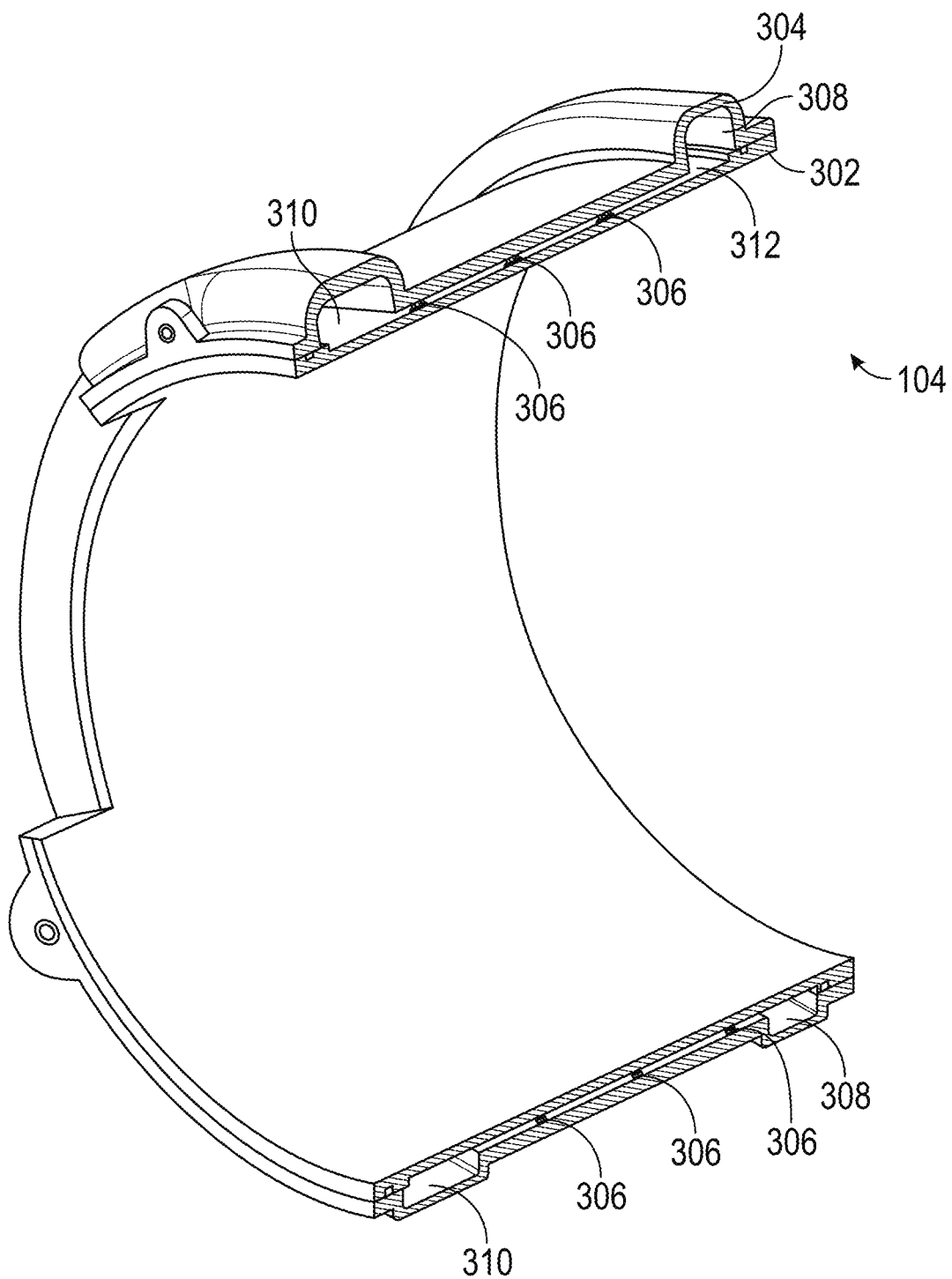
FIG. 3 is a schematic partial cross-sectional view of a cooling jacket of the motor illustrated in FIG. 1.
Figure 4:
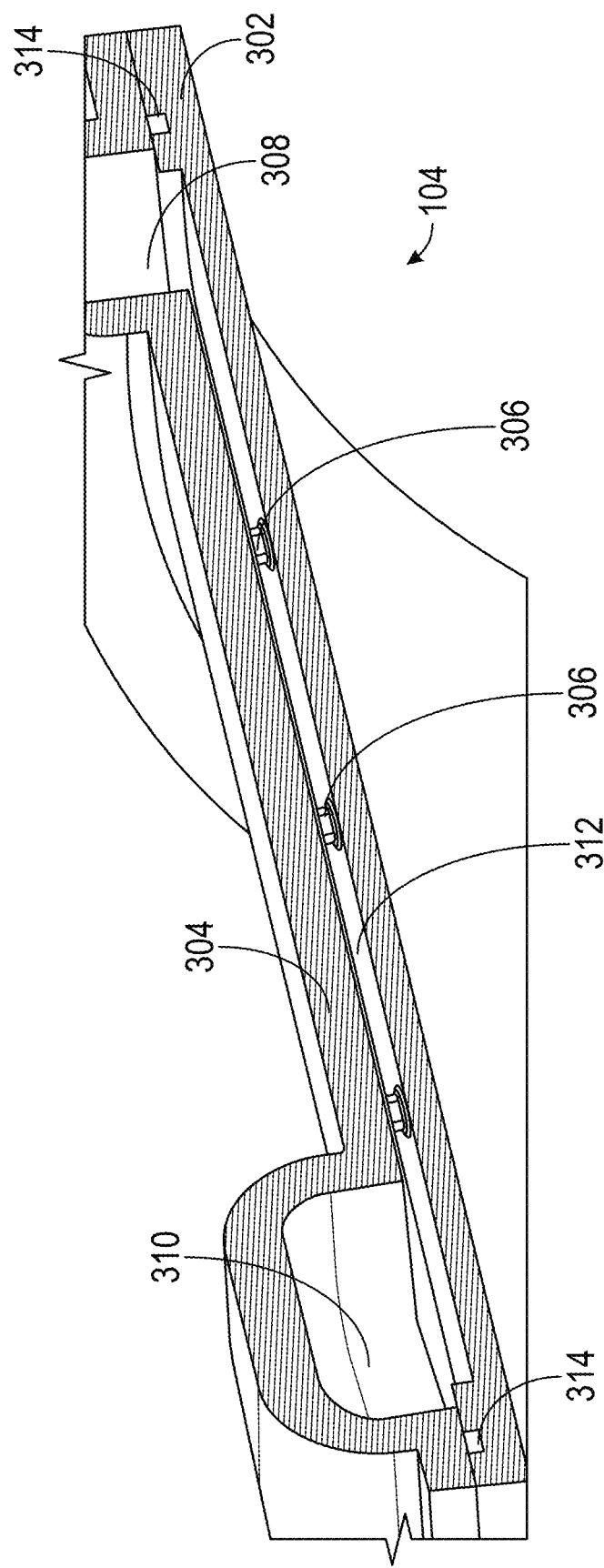
FIG. 4 is an enlarged partial cross-sectional view of the cooling jacket illustrated in FIG. 3.

FIG. 3 is a partial cross-sectional view of jacket 104, and FIG. 4 is an enlarged partial cross-sectional view of jacket 104. The jacket 104 includes an outer shell 304 and an inner shell 302 located within, e.g., concentrically within, outer shell 304. An interior space 312, e.g., an annular space, is arranged between the inner shell 302 and the outer shell 304 and is fluidically sealed to the external environment to contain coolant fluid 148 therein. Coolant 148 flows into inlet 112 into the interior space 312, where it absorbs heat energy from motor 100, and exits from interior space 312 through outlet 114. An inlet manifold 308 is arranged at or near one axial end of the jacket 104, and an outlet manifold 310 is arranged at or near the opposite axial end of the jacket 104 relative to the inlet manifold 308.

The inlet manifold 308 may have a cross-sectional area, measured, for example, in the radial direction, that is larger than the interior space 312, e.g., over at least a portion of the entire circumference of the jacket 104, over the entire circumference of the jacket 104, etc. The outlet manifold 310 may also have a cross-sectional area, measured, for example, in the radial direction, that is larger than the interior space 312, e.g., over at least a portion of the entire circumference of the jacket 104, over the entire circumference of the jacket 104, etc. The cross-sectional geometries of the inlet and outlet manifolds 308, 310 may be uniform around the circumference of the jacket 104, may vary around the circumference of the jacket 104, etc. The cross-sectional geometries of the inlet and outlet manifolds 308, 310 may provide that substantially uniform coolant flow is achieved around the entire circumference of the jacket 104, and the cross-sectional geometries of the inlet and outlet manifolds 308, 310 may be large enough to accommodate fittings at the inlet 112 and/or outlet 114. Additionally, the cross-sectional geometries of the inlet and outlet manifolds 308, 310 may be at least as large as the cross-sectional geometries of the inlet 112 and/or outlet 114 so that coolant fluid flowing into and out of the jacket 104 is not restricted by the manifolds 308, 310 or the transition between the inlet 112, the outlet 114, and the manifolds 308, 310. Since the cross-sectional area of the interior space 312 is smaller than that of the inlet manifold 308, for example, flow velocity of the coolant fluid 148 in the interior space 312 is higher than in the inlet manifold 308, thereby enhancing the heat transfer to the coolant fluid 148 and cooling performance of the motor 100.

As an example, which is not intended to be limiting, the inlet manifold 308 has a cross-sectional area, measured in the radial direction, that is largest at or near the inlet 112, and the cross-sectional area, measured in the radial direction, reduces with greater distance, e.g., circumferential distance, from the inlet 112. Similarly, the outlet manifold 310 has a cross-sectional area, measured in the radial direction, that is largest at or near the outlet 114, and the cross-sectional area, measured in the radial direction, reduces with greater distance, e.g., circumferential distance, from the outlet 114. The cross-sectional areas of the inlet manifold 308 and outlet manifold 310 may be the same or different according to circumferential position around jacket 104, may be the same or different according to circumferential distance from inlet 112, for the inlet manifold 308, or from outlet 114, for the outlet manifold 310. The cross-sectional areas of the inlet manifold 308 and outlet manifold 310 may decrease, e.g., monotonically, with greater distance from the inlet 112 and outlet 114, respectively. The inlet manifold 308 may have a greater, lesser, or equal width, measured in the axial direction of jacket 104, than outlet manifold 310, the inner manifold 308 may have a greater, lesser, or equal height, measured in the radial direction of jacket 104, than outlet manifold 310, and the inner manifold 308 may have a greater, lesser, or equal length, measured in the circumferential direction of jacket 104, than outlet manifold 310.

The cross-sectional geometries of the inlet manifold 308 and outlet manifold 310 provide for predetermined pressure profiles around the circumference of jacket 104 and in the axial and radial directions of the jacket 104. For example, the inlet manifold 308 and outlet manifold 310 are sized and dimensioned, e.g., circumferentially, axially, and radially, so that substantially uniform axial flow of coolant fluid 148 is achieved between the inlet manifold 308 and outlet manifold 310 around the entire circumference of jacket 104 between inner shell 302 and outer shell 304.

The inlet manifold 308 and/or outlet manifold 310 may extend entirely around the entire circumference of jacket 104, so that coolant fluid 148 entering inlet manifold 308 through inlet 112, flows in the inlet manifold 308 circumferentially away from the inlet 112 in two opposite directions, e.g., clockwise and counter-clockwise, axially toward outlet manifold 310 between inner shell 302 and outer shell 304, and into outlet manifold 310 circumferentially toward outlet 114 in two opposite directions, e.g., clockwise and counter-clockwise. The inlet manifold 308 and/or outlet manifold may extend substantially but not entirely around the entire circumference of jacket, so that coolant fluid 148 entering inlet manifold 308 through inlet 112, flows in the inlet manifold 308 circumferentially away from the inlet 112, axially toward outlet manifold 310 between inner shell 302 and outer shell 304, and into outlet manifold 310 circumferentially toward outlet 114. The inlet manifold 308 and/or outlet manifold may extend partially around the entire circumference of jacket, so that coolant fluid 148 entering inlet manifold 308 through inlet 112, flows in the inlet manifold 308 circumferentially away from the inlet 112, axially toward outlet manifold 310 between inner shell 302 and outer shell 304, and into outlet manifold 310 circumferentially toward outlet 114. Inner shell 302 and outer shell 304 may be permanently affixed to each other, e.g., by welding, adhesives, etc., and/or may be arranged to be disassembled, e.g., for service, cleaning, etc. One or more seals 314 may be provided between opposed and abutting surfaces of inner shell 302 and outer shell 304 to provide fluid-tight sealing of space 312 between inner shell 302 and outer shell 304 to prevent coolant fluid 148 from escaping the jacket 104.

The inner shell 302 and/or outer shell 304 may include heat-transfer and turbulence inducing structures 306 axially between the inlet manifold 308 and outlet manifold 310. The structures 306 may extend axially from the inner shell 302 toward the outer shell 304 and/or axially from the outer shell 304 toward the inner shell 302. The structures 306 may extend partially between the inner shell 302 and the outer shell 304, so that a gap exists between an axial end of the structure 306 and the opposing one of the inner shell 302 and outer shell 304, and/or the structures 306 may extend entirely between the inner shell 302 and the outer shell 304, so that the structures 306 contact the opposing one of the inner shell 302 and outer shell 304. The structures 306 may be arranged as, for example, bumps, nubs, projections, protrusions, pillars, etc., and increase the surface area of inner shell 302 and/or outer shell 304 from which they project or extend to increase the heat-transfer capacity of the inner shell 302 and/or outer shell 304 to coolant fluid 148. The structures 306 also increase turbulence of coolant fluid 148 flowing in the space 312 between inner shell 302 and outer shell 304, further increase heat transfer from the inner shell 302 and/or outer shell 304 to the coolant fluid 148.

Figure 5:
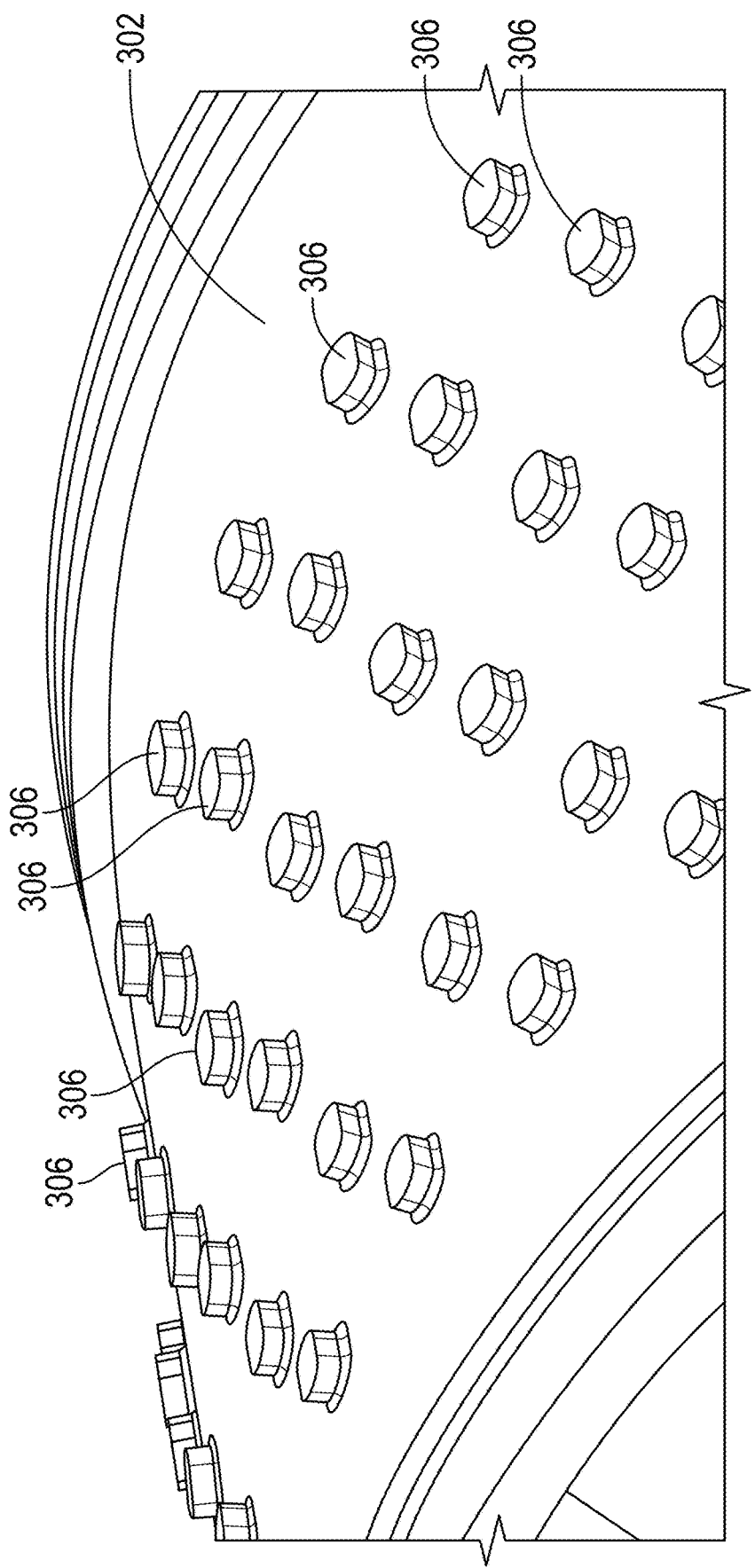
FIG. 5 is an enlarged perspective view of the cooling jacket illustrated in FIGS. 3 and 4.

FIG. 5 is an enlarged perspective view of inner shell 302, schematically illustrating structures 306 in greater detail. The structures 306 may be formed by stamping, dimpling, pressure forming, etc., from a radially interior side of the inner shell 302 and/or from a radially exterior side of the outer shell 304, and/or they may be formed by machining, e.g., milling, electrical discharge machining (EDM), turning, etc., the radially outer side of inner shell 302 and/or the radially inner side of the outer shell 304. The structures 306 may be manufactured separately from the inner shell 302 and/or outer shell 304 and may be attached thereto, via, e.g., adhesives, welding, mechanical attachment, rivets, screws, etc. The inner shell 302 and/or outer shell 304 may be formed by a casting process, and the structures 306 may be formed as part of that casting process. The radially interior side of the inner shell 302 may be smooth, to provide for maximized thermal conduction and heat transfer from the stator 106 to the jacket 104 and ultimately to the coolant fluid 148.

The inlet manifold 308 and/or the outlet manifold 310 may include nozzles, restrictors, vanes, etc., to enhance or affect the flow of coolant fluid 148 from inlet manifold 308 to outlet manifold 310, to achieve substantially uniform axial flow of coolant fluid 148 around the entire circumference of motor 100, etc. In certain circumstances, it may be appropriate to provide additional or lesser cooling at certain locations around the circumference of motor 100 and/or along its axial length. For example, an inverter of the motor 100 may produce additional heat and may therefore require additional cooling. Thus, the inlet manifold 308, the outlet manifold 310, and the structures 306 may be arranged so that additional coolant fluid 148 flows in the area surrounding the inverter to provide for additional cooling. Moreover, additional or fewer structures 306 may be provided in areas of the motor 100 requiring greater or lesser cooling. As noted above, the structures 306 may extend from inner shell 302 to outer shell 304, and, in doing so, may provide structural support for the inner shell 302 and/or the outer shell, may provide for transfer of heat energy from the inner shell 302 to the outer shell 304, or vice versa, in addition to the transfer of heat energy to the coolant fluid 148.

Figure 6:
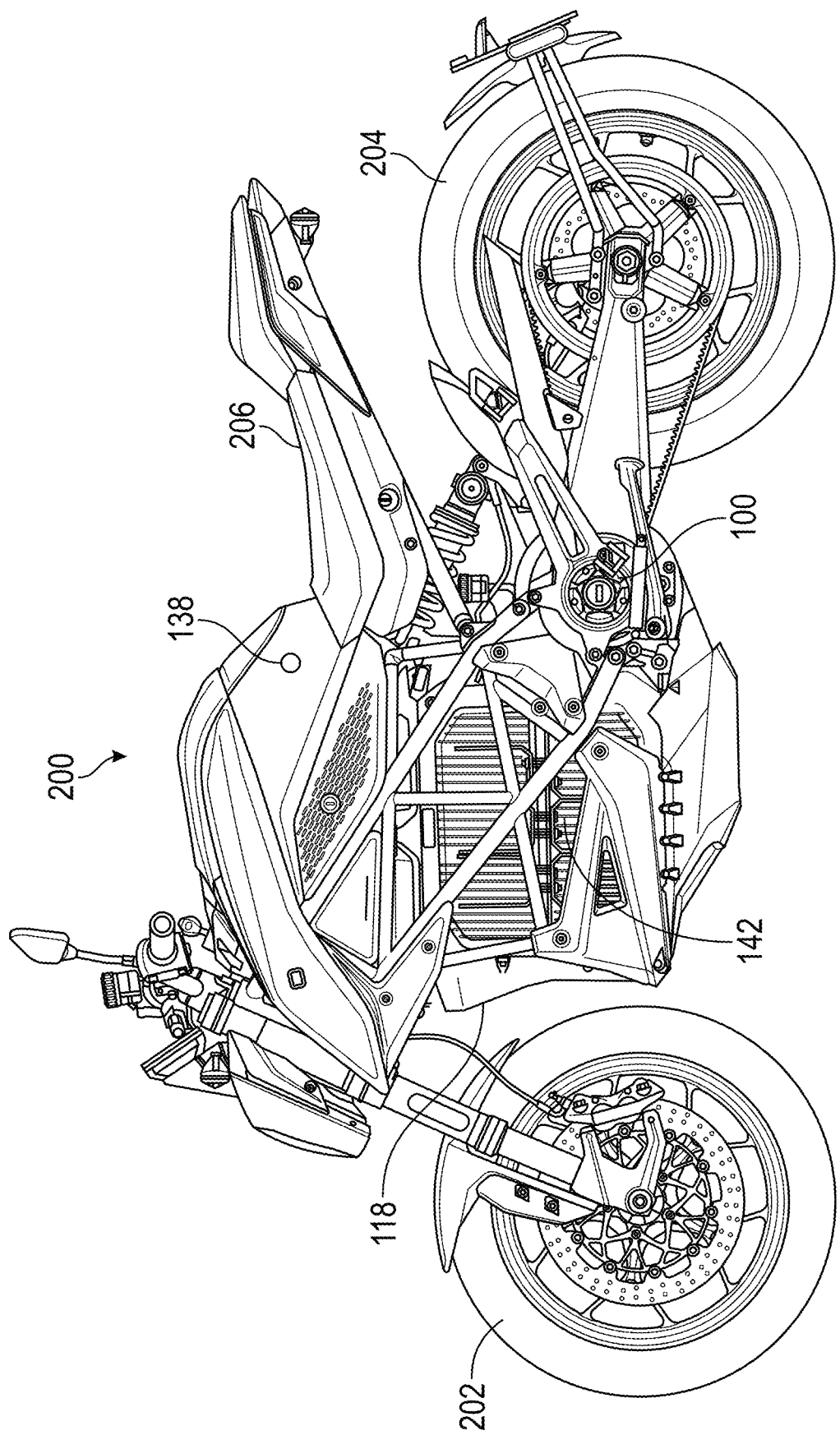
FIG. 6 is a schematic side view of a two-wheeled vehicle including the motor illustrated in FIG. 1.

FIG. 6 is a side view of a vehicle 200 that includes motor 100. The vehicle 200 may be arranged as a two-wheeled vehicle, e.g., a motorcycle, a hybrid vehicle, an electric vehicle (EV), a plug-in electric hybrid vehicle (PHEV), etc. The vehicle 200 includes a front wheel 202, a rear wheel 204, and a seat 206 adapted to accommodate a driver and, for example, a passenger thereon. The motor 100 may be adapted to drive the rear wheel 204 via a belt, chain, driveshaft, etc., to thereby propel the vehicle 200 according to the driver's instructions. It should be understood that motor 100 may be provided in vehicles other than two-wheeled vehicle. Thus, for example, motor 100 may be provided in an automobile, truck, boat, air vehicle, construction equipment, rail equipment, etc. Moreover, motor 100 may be utilized in systems, devices, etc., other than vehicles. For example, motor 100 may be utilized in construction equipment, generators, elevators, escalators, moving walkways, computer equipment, industrial equipment, machine tools, chemical plants, treatment plants, pumping stations, etc.

The jacket 104 may be formed of a material having a high thermal conductivity, e.g., aluminum, or a combination of materials, e.g., an aluminum core and stainless-steel cladding. The inner shell 302 and outer shell 304 may be formed of the same material or combination of materials or may be formed of different materials or combinations of materials. For example, the inner shell 302 may be formed of a material, or combination of materials, having a higher thermal conductivity than the outer shell 304 so that the coolant fluid 148 absorbs heat energy from the components of the motor 100, e.g., the stator 106, rotor 108, etc., that are located inside of the inner shell 302 and that are thermally coupled to the inner shell 302, rather than absorbing heat energy from the outer shell 304 or components thermally coupled to the outer shell. The coolant fluid 148 may thermally couple the inner shell 302 and the outer shell 304 so that coolant fluid 148 flowing therebetween absorbs heat energy via the inner shell 302 and dissipates heat energy to the outer shell 304, and the outer shell 304 dissipates heat energy to the environment, in addition to heat energy being dissipated to the environment by radiator 118.

While jacket 104 is described in relation to a motor 100, it should be understood that jacket 104 may be utilized for cooling other heat producing devices or systems, such as internal combustion engines.

What is claimed is:

1. A liquid cooled motor enclosure, comprising:
an outer shell;
an inner shell connected to the outer shell, a fluid tight space being formed between the inner shell and the outer shell, the inner shell having a recess adapted to receive a motor therein, the inner shell being adapted to thermally couple to the motor;
an inlet manifold arranged proximate to a first axial end of the inner shell and/or the outer shell; and
an outlet manifold arranged proximate to a second axial end of the inner shell and/or the outer shell opposite the first axial end;
wherein the inner shell includes a plurality of projections extending into the space formed between the inner shell and the outer shell; and
wherein the manifolds have a larger cross-section in a radial direction, over at least a portion of an entire circumference of the motor enclosure, than the fluid tight space.

2. The liquid cooled motor enclosure according to claim 1, wherein the space formed between the inner shell and the outer shell is adapted to contain a coolant fluid.

3. The liquid cooled motor enclosure according to claim 1, wherein the coolant fluid includes a water-based coolant fluid or an oil-based coolant fluid.

4. The liquid cooled motor enclosure according to claim 1, wherein the inner shell and/or the outer shell are substantially cylindrical.

5. The liquid cooled motor enclosure according to claim 1, wherein the projections extend axially from the inner shell toward the outer shell.

6. The liquid cooled motor enclosure according to claim 1, wherein the projections extend between the inner shell and the outer shell.

7. The liquid cooled motor enclosure according to claim 1, wherein the projections thermally couple the inner shell and the outer shell.

8. The liquid cooled motor enclosure according to claim 1, wherein the inner shell has a higher thermal conductivity than the outer shell.

9. The liquid cooled motor enclosure according to claim 1, wherein the projections are substantially cylindrical.

10. The liquid cooled motor enclosure according to claim 1, wherein the motor is arranged as a motor of an electric vehicle.

11. The liquid cooled motor enclosure according to claim 10, wherein the vehicle includes a two-wheeled vehicle.

12. The liquid cooled motor enclosure according to claim 1, further comprising a seal arranged between the inner shell and the outer shell adapted to fluidically seal the fluid tight space located between the inner shell and the outer shell.

13. The liquid cooled motor enclosure according to claim 1, wherein the recess is substantially cylindrical.

14. The liquid cooled motor enclosure according to claim 1, wherein the projections are adapted to increase turbulence in coolant fluid flowing in the space.

15. The liquid cooled motor enclosure according to claim 1, wherein the inner shell is adapted to be mounted directed around the motor.

16. The liquid cooled motor enclosure according to claim 1, wherein the projections extend into the fluid tight space formed between the inner shell and the outer shell.

17. A motor, comprising:
a stator;
a rotor arranged inside of the stator and rotatable relative to the stator; and
a liquid cooled motor enclosure, the stator and rotor being arranged inside of the liquid cooled motor enclosure, the liquid cooled motor enclosure being thermally coupled to the stator, the liquid cooled motor enclosure including:
an outer shell;
an inner shell connected to the outer shell, a fluid tight space being formed between the inner shell and the outer shell, the inner shell having a recess, the motor being received in the recess, the inner shell being thermally coupled to the motor;
an inlet manifold arranged proximate to a first axial end of the inner shell and/or the outer shell; and
an outlet manifold arranged proximate to a second axial end of the inner shell and/or the outer shell opposite the first axial end;
wherein the inner shell includes a plurality of projections extending into the space formed between the inner shell and the outer shell; and
wherein the manifolds have a larger cross-section in a radial direction, over at least a portion of an entire circumference of the motor enclosure, than the fluid tight space.

18. The motor according to claim 17, further comprising a radiator connected to the coolant fluid inlet, a coolant fluid contained in the radiator and the fluid tight space formed between the inner shell and the outer shell, and a pump adapted to pump the coolant fluid to circulate the coolant fluid between the radiator and the fluid tight space formed between the inner shell and the outer shell.

19. The motor according to claim 18, further comprising a fan adapted to force an airflow through, past, and/or along the radiator to dissipate to the external environment heat energy transferred from the motor to the coolant fluid and from the coolant fluid to the radiator.

20. The motor according to claim 17, wherein the projections extend into the fluid tight space formed between the inner shell and the outer shell.

21. The motor according to claim 17, further comprising a radiator connected between the coolant fluid inlet and the coolant fluid outlet, a coolant fluid contained in the radiator and the fluid tight space formed between the inner shell and the outer shell, and a pump adapted to pump the coolant fluid to circulate the coolant fluid between the radiator and the fluid tight space formed between the inner shell and the outer shell.

22. A vehicle, comprising:
an energy storage device adapted to store electrical energy;
at least one wheel;
a motor adapted to be powered by the electrical energy stored in the energy storage device and to drive the wheel to propel the vehicle, the motor including:
a stator;
a rotor arranged inside of the stator and rotatable relative to the stator; and a liquid cooled motor enclosure, the stator and rotor being arranged inside of the liquid cooled motor enclosure, the liquid cooled motor enclosure being thermally coupled to the stator, the liquid cooled motor enclosure including:
   an outer shell;
   an inner shell connected to the outer shell, a fluid tight space being formed between the inner shell and the outer shell, the inner shell having a recess, the motor being received in the recess, the inner shell being thermally coupled to the motor;
   an inlet manifold arranged proximate to a first axial end of the inner shell and/or the outer shell; and
   an outlet manifold arranged proximate to a second axial end of the inner shell and/or the outer shell opposite the first axial end;
wherein the inner shell includes a plurality of projections extending into the space formed between the inner shell and the outer shell; and
wherein the manifolds have a larger cross-section in a radial direction, over at least a portion of an entire circumference of the motor enclosure, than the fluid tight space.

23. The vehicle according to claim 22, wherein the vehicle is arranged as a two-wheeled electric vehicle, and the energy storage device includes a rechargeable battery.

24. The vehicle according to claim 22, wherein the projections extend into the fluid tight space formed between the inner shell and the outer shell.

* * * * *